(12) United States Patent
Dumm

(10) Patent No.: US 8,083,420 B2
(45) Date of Patent: *Dec. 27, 2011

(54) CAMERA CONTROL SYSTEM AND ASSOCIATED PAN/TILT HEAD

(76) Inventor: Mark T. Dumm, Cleveland Hts., OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,669

(22) Filed: Oct. 11, 2010

(65) Prior Publication Data

US 2011/0026913 A1 Feb. 3, 2011

Related U.S. Application Data

(63) Continuation of application No. 12/265,194, filed on Nov. 5, 2008, now Pat. No. 7,811,008, which is a continuation of application No. 11/122,682, filed on May 5, 2005, now Pat. No. 7,527,439.

(60) Provisional application No. 60/568,596, filed on May 6, 2004.

(51) Int. Cl.
*G03B 17/00* (2006.01)

(52) U.S. Cl. ........................................ 396/419; 396/428

(58) Field of Classification Search .......... 396/427–428; 248/183.4; 352/243
See application file for complete search history.

(56) References Cited

U.S. PATENT DOCUMENTS

| | | |
|---|---|---|
| 1,493,367 A | 5/1924 | Mery |
| 1,943,360 A | 1/1934 | Arnold |
| 2,796,226 A | 6/1957 | Dalton et al. |
| 3,273,484 A | 9/1966 | Lapsley |
| 3,995,797 A | 12/1976 | Knight |
| 4,040,587 A | 8/1977 | Gottchalk et al. |
| 4,157,476 A | 6/1979 | O'Connor |
| 4,337,482 A | 6/1982 | Coutta |
| 4,447,033 A | 5/1984 | Jaumann et al. |
| 4,466,590 A | 8/1984 | Parks et al. |
| 4,557,459 A | 12/1985 | Lindsay |
| 4,657,220 A | 4/1987 | Lindsay |
| 4,732,357 A | 3/1988 | Lindsay |
| 5,056,745 A | 10/1991 | Gelbard |
| 5,111,288 A | 5/1992 | Blackshear |
| 5,150,627 A | 9/1992 | Lindsay |
| 5,170,197 A | 12/1992 | Schmidt et al. |
| 5,218,876 A | 6/1993 | Lindsay |

(Continued)

OTHER PUBLICATIONS

Ulti-Head, Mark Roberts Motion Control Ltd., Unit 4, Birches Ind Est., Imberhorne Lane, East Grinstead, W. Sussex, RH19 1XZ, England (2 pages).

(Continued)

*Primary Examiner* — Christopher Mahoney
(74) *Attorney, Agent, or Firm* — Fay Sharpe LLP; Richard M. Klein

(57) ABSTRACT

An apparatus for controlling one or more cameras is provided. The apparatus includes: a mounting sled, a tilt drive motor, a tilt drive train, a pan drive motor, and a pan drive train. The mounting sled includes a camera platform between two sled runners. A lower surface of each sled runner is formed by a circular arc. The tilt drive train includes a tilt drive shaft having an axis perpendicular to the camera platform. The pan drive train includes a pan drive shaft extending along the axis of the tilt drive shaft such that it receives the tilt drive shaft and turns independently and concentrically about the tilt drive shaft. The camera platform receives a camera such that the center of gravity of the camera is aligned with the diameter of the circular arc of the sled runners and the vertical axis of the tilt and pan drive shafts.

8 Claims, 14 Drawing Sheets

U.S. PATENT DOCUMENTS

| | | |
|---|---|---|
| 5,288,043 A | 2/1994 | Tigliev |
| 5,389,972 A | 2/1995 | Cartoni |
| 5,469,793 A | 11/1995 | Lindsay |
| 5,627,616 A | 5/1997 | Sergeant et al. |
| 5,850,579 A | 12/1998 | Melby et al. |
| 5,956,081 A | 9/1999 | Katz et al. |
| 6,027,257 A | 2/2000 | Richards et al. |
| 7,527,439 B1 | 5/2009 | Dumm |
| 2003/0093805 A1 | 5/2003 | Gin |
| 2005/0052531 A1 | 3/2005 | Kozlov et al. |

OTHER PUBLICATIONS

432, RADAMEC Broadcast Systems Ltd., Bridge Road, Chertsey, Surrey, KT16 8LJ, England (2 pages).

2 and 3 Axis Remote Head SB92 from Servicevision System in the World, Servicevision System S.A., Pedrosa A, 44, Poligono Industrial Gran Via Sur, 08908 L'Hospitalet (Barcelona) Spain, (1 page).

Mirus, Motion Control for the Masses, View Factor Studios LLC, 46930 Fairview Road, Newberry Springs, CA 92365 (1 page).

HS-102P Servo Pan & Tilt Head, AutoCam, Vinten Inc., 709 Executive Blvd, Valley Cottage, NY 10989, (2 pages).

CAMERA CONTROL SYSTEM AND ASSOCIATED PAN/TILT HEAD

This application is a continuation of U.S. patent application Ser. No. 12/265,194, filed Nov. 5, 2008, now U.S. Pat. No. 7,811,008, which is a continuation of U.S. patent application Ser. No. 11/122,682, filed May 5, 2005, now U.S. Pat. No. 7,527,439, titled "CAMERA CONTROL SYSTEM AND ASSOCIATED PAN/TILT HEAD," which claims the priority benefit of U.S. Provisional Application Ser. No. 60/568,596, filed May 6, 2004, the disclosures of which are incorporated herein by reference in their entirety.

BACKGROUND OF INVENTION

The invention relates to a control system for a camera. It finds particular application in conjunction with a pan/tilt head and associated methods for controlling one or more cameras and will be described with particular reference thereto. However, it is to be appreciated that the invention is also amenable to other applications. For example, the pan/tilt head may be used to control another type of payload instead of a camera payload.

In the design of any camera control system, an important factor to be considered is the camera's center of gravity (c.g.). The farther the camera's c.g. is from either motion axis (such as motion around the vertical axis, otherwise known as "pan" or motion around the horizontal axis, otherwise known as "tilt") the more torque will be needed to move the camera to the desired location. Historically, designers of remote control pan/tilt camera heads have dealt with the issue of camera c.g. in one of two ways.

In one approach, previous designers chose one or the other (vertical or horizontal) axis and rotated the camera around its c.g. in that axis only. If the designers choose to rotate the camera around the vertical axis, then the camera is mounted on the top of the device. The problem with this design is that as soon as the camera is tilted or moved around the horizontal axis, the weight of the camera is shifted forward or backward. This weight must then be lifted in order to revert to the original position and, until that is done, the whole system of camera and mount is in an unbalanced state. This imbalance requires more motor force to move the camera. If the designers choose to rotate the camera around the horizontal axis, then the camera is mounted from the side of the device. Here, the camera may be tilted up and down without shifting its weight forward and backward, but additional torque is required to pan the camera since the c.g. of the camera is offset from the center of rotation around the vertical axis.

In other approaches, previous designs feature the camera moving both horizontally and vertically around the camera's c.g. This is done using a relatively large framework and an "L-shaped" or "U-shaped" bracket. The tilting motor and bearings are located to the side of the camera, and the panning motor and bearings are located directly below (or above) the camera. Though the camera usually remains balanced, it is at the expense of a larger and heavier support framework, which must be moved right along with the camera as it is panned.

The concept of a circular sled or cam design has existed for many years in the design of traditional pan/tilt heads for cameras in the film industry because of the requirements of large and heavy film cameras. In previous designs, the sled moves independently from the main chassis body with respect to vertical tilting around the horizontal axis, but it does not do so with respect to the panning motion. Previously, horizontal panning was initiated at the base of the entire chassis requiring that the entire assembly (camera and pan/tilt head) be moved from left to right. This is also the case with the prior camera mount configurations described above. In previous designs, the camera and its mounting plate are not isolated from the motor chassis and supporting framework with respect to motion around both the vertical and horizontal axes.

In previous motorized pan/tilt head designs, the path of the transmission of power from the motor to the camera mounting structure is along a different axis for movement in the horizontal and vertical planes. Therefore movement around one axis changes the positional relationship and the contact point between the camera mounting structure and the motor for movement around the other axis. In prior remote control pan/tilt head designs, the solution invariably chosen involved isolating the camera mounting bracket from the motor chassis and structural framework with respect to movement around the horizontal axis (tilting) while locking the camera mounting bracket to the motor chassis with respect to movement around the vertical axis (panning). In other words, when tilting, only the camera and mounting bracket moves, but when panning, the entire device, including both motors, is moved. This increases the torque requirement of the panning motor significantly. The main body of the pan/tilt head, as well as both pan and tilt motors, remain stationary as the camera and its mounting apparatus move around both the horizontal and vertical axes.

In the past, the bottom surfaces of circular sled runners have had a flat cross-section enabling it to roll smoothly over the flat races of either ball or roller bearings. Of course, free movement forward and backward over the bearings is necessary, but side to side play is undesirable.

Methods for controlling any remote control pan/tilt head have typically fallen into three categories. Most common is the "joystick" method of control. As the operator pushes a switched lever either left, right, up or down, the camera moves likewise. The problem with this method is that it is not natural for a trained camera operator. It is difficult to make gentle or subtle moves because there is no sensory feedback to your hand which signals how the camera is responding. The resultant moves invariably look very mechanical and unnatural. The second method employs a computer interface to convert either pressure on a pressure sensitive tablet or touch sensitive screen into commands for the remote control camera head. Though with practice, this is probably preferable to a joystick, it still does not provide enough feedback or information to the user to make lifelike camera moves. The third method uses an electromechanical control arm identical in size and feel to the arm on a traditional mechanical pan/tilt head. Currently, this type of electromechanical control arm has been implemented using a traditional mechanical panning head at its center. Two position encoders (one for each axis of movement) are added to this head. As the operator manipulates the mechanical pan/tilt head, the computer reads the signals from the encoders that correspond to movements in the controller head. The computer then translates these signals into movement commands for the remote control head. The camera moves exactly in tandem with the control arm. The distance the controller moves is the distance the camera moves. The speed the controller is pushed corresponds to the speed that the camera moves. This offers feedback for smooth "human" camera moves. With a joystick, typically the distance that the lever is displaced from its center is proportional to the speed at which the camera moves. There is no correspondence between the distance the joystick lever is pushed and the distance the camera moves.

Previous implementations of a computer control interface have offered little more in the way of visual feedback cues than a simple joystick. For example, as you touch a screen or pressure sensitive tablet farther away from the center of the control area the camera moves faster in that direction. This relies on the operator judging the center of the control area as he is concentrating on the picture in his monitor, which can be difficult. Particular attention is required when the operator wants to slow his camera gradually to a stop. He is required to follow an imaginary path back to the center with his finger and if he overshoots the center point of the control area even slightly, the camera image will appear to back up.

Thus, there is a particular need for improvements to existing pan/tilt equipment and methods for controlling one or more cameras in a camera system. The invention contemplates a new and improved camera control system with a pan/tilt head that overcomes at least one of the above-mentioned problems and others.

BRIEF SUMMARY OF INVENTION

In one aspect of the invention, an apparatus for controlling one or more cameras is provided. The apparatus includes: a mounting sled, including a camera platform disposed between two sled runners, wherein a lower surface of each sled runner is formed by a circular arc having a determined diameter, a tilt drive motor, a tilt drive train in operative communication with the tilt drive motor and the mounting sled, the tilt drive train including a tilt drive shaft having an axis extending in a perpendicular direction with respect to the camera platform, wherein operation of the tilt drive motor moves the mounting sled in a tilt direction, a pan drive motor, and a pan drive train in operative communication with the pan drive motor and the mounting sled, the pan drive train including a pan drive shaft extending in a perpendicular direction with respect to the camera platform along the axis of the tilt drive shaft such that the pan drive shaft receives the tilt drive shaft and turns independently and concentrically about the tilt drive shaft, wherein operation of pan drive motor moves the mounting sled in a pan direction. The apparatus is adapted such that when the camera platform receives a camera the center of gravity of the camera is aligned with the diameters of the circular arcs of both sled runners along a horizontal axis and the vertical axis of the tilt and pan drive shafts.

In another embodiment of the invention, the concentric pan and tilt shafts are employed to transmit motion from the pan and tilt motors to a dual pantograph camera mounting apparatus. Rather than the circular sled or cam mount, the camera platform is supported at the corners by four vertical bars that elevate and rotate the camera platform such that the camera moves around its center of gravity in both the vertical and horizontal axes. The vertical support bars are constrained to vertical orientation by the dual pantographic linkages by which they are attached to the chassis of the invention and driven by the pan and tilt motors.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION

Figure 1:
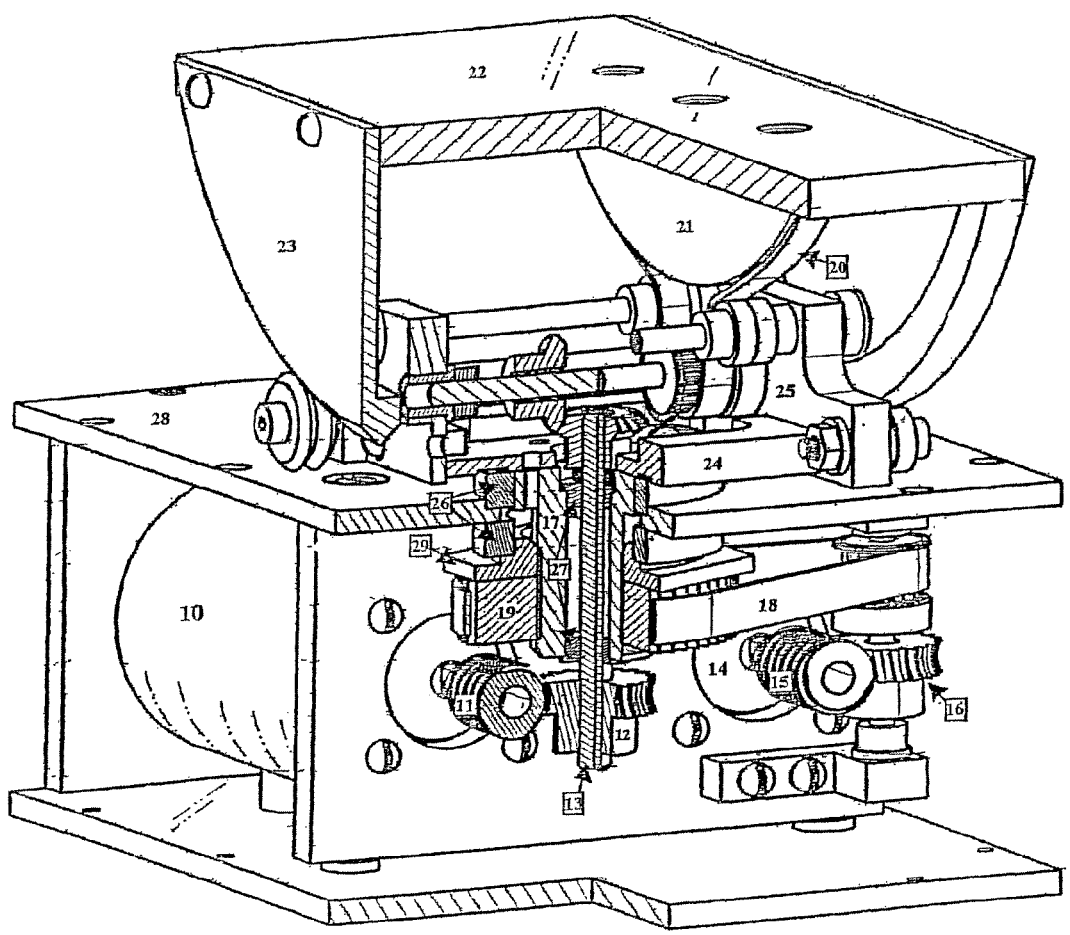
FIG. 1 is an embodiment of a pan/tilt head with a 90-degree cutaway form.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

The camera control system is comprised of several discrete components, which combine to provide camera control while giving special consideration to the parameters of camera payload weight, speed of movement, physical size, visual obtrusiveness, audible noise, adaptability to different size cameras, and movement consistent with that of a traditional human-operated mechanical pan/tilt head. In other words, an associated pan/tilt head is small, light, quiet, and able to support and quickly move a large camera from one position to another in a manner indistinguishable from the traditional manned camera with respect to the camera's image output. In addition, the invention addresses the economic issues of television and film production cost and increased efficiency and lower cost of operation to the end user. These benefits are made possible by the inclusion of a computer interface, which facilitates a limited number of technicians operating a large number of cameras.

In one aspect of the invention, the pan/tilt head moves the camera around its c.g. with respect to both the vertical and horizontal axis. It does so, however, while maintaining a smaller more compact framework, which is situated directly below the camera. In an alternate configuration, the unit may be operated in an inverted position where the camera is suspended beneath the mount. In one embodiment of the pan/tilt head, the camera is mounted on a movable "sled" with circular runners, which travel on fixed roller bearings. As the sled rolls on its runners over the bearings, the camera is tilted up and down. Because the c.g. of the camera is positioned exactly at the center of the virtual circle described by the arc of the sled runners, it is not shifted either forward, backward, up, or down. The camera is also mounted with its c.g. directly on the vertical axis, so panning the camera left and right requires minimum motor torque.

FIG. 1 depicts one embodiment of the pan/tilt head incorporating aspects of the invention with a 90-degree cutaway form. The vertex of the cutaway represents the center of the power transmission shafts for both the panning and tilting axis. The pan/tilt head includes a tilt motor 10, a worm screw 11, a worm gear 12, a tilt drive shaft 13, a pan motor 14, a worm screw 15, a worm gear 16, a pan drive shaft 17, a pan drive belt 18, a pulley 19, a tilt drive belt 20, and a pulley 21. These components form separate pan and tilt drive trains. The camera is affixed to the mounting sled, which is composed of a camera platform 22 and two sled runners 23. Supporting the mounting sled is a sled support, which is composed of a sled support table 24 and two sled support sides 25. Finally, the pan and tilt drive shafts are supported and allowed to rotate freely by a series of four bearing units. There are two pan drive shaft bearings 26 and two tilt drive shaft bearings 27.

The configuration of the tilt drive train depicted in FIG. 1 is chosen for its strength when heavier loads are to be carried by the camera platform 22. Of course, any one or more of the various screws, gears, shafts, belts, and pulleys making up the tilt drive train may be replaced by one or more drive train components capable of accomplishing like or similar functions. For example, FIG. 10 shows many of the drive train components above the motor housing case top 28 replaced with several pulleys 32, 33, 34 and a cable 35.

Figure 10:
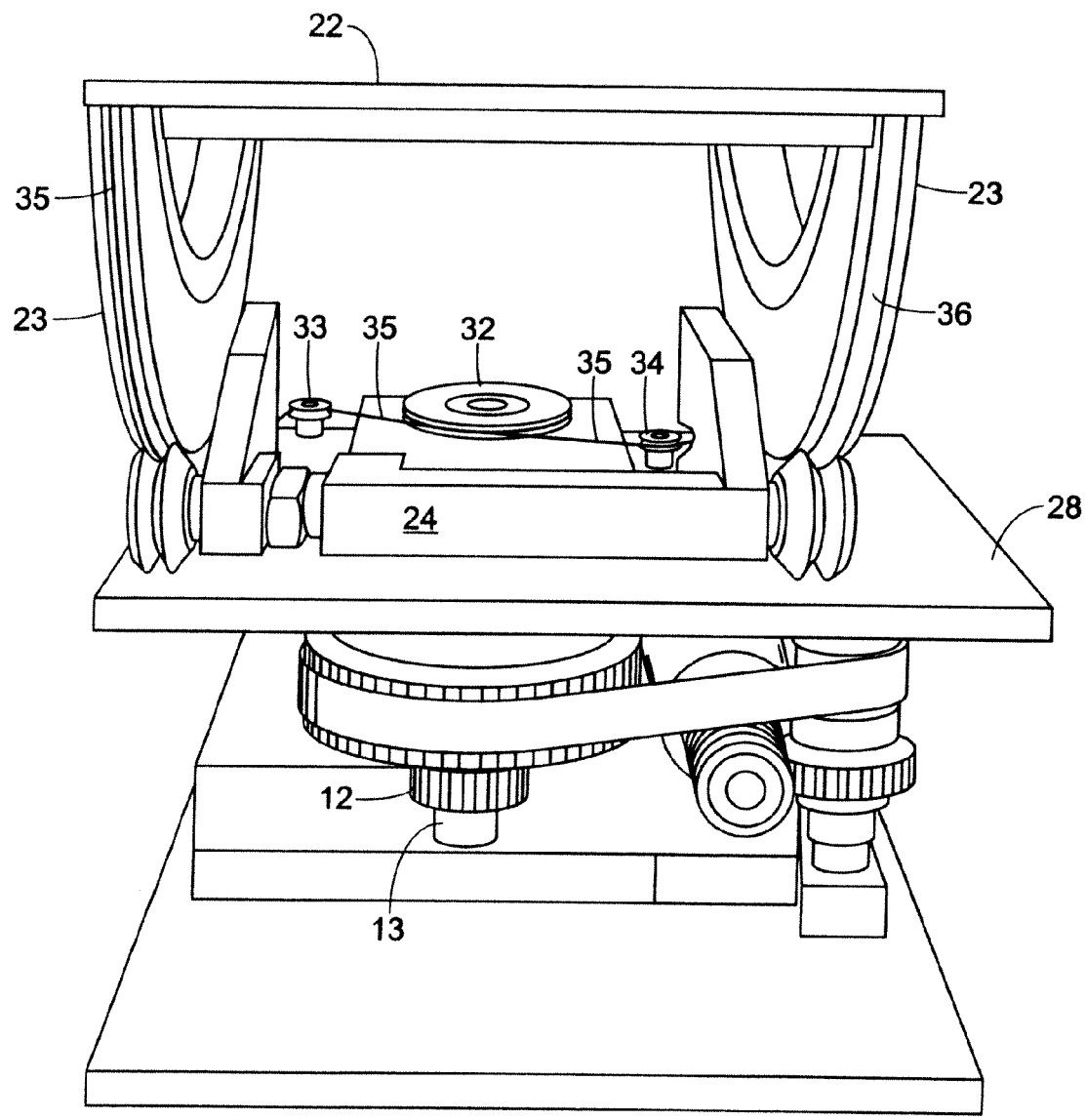
FIG. 10 is still another embodiment of a pan/tilt head.
Figure 11:
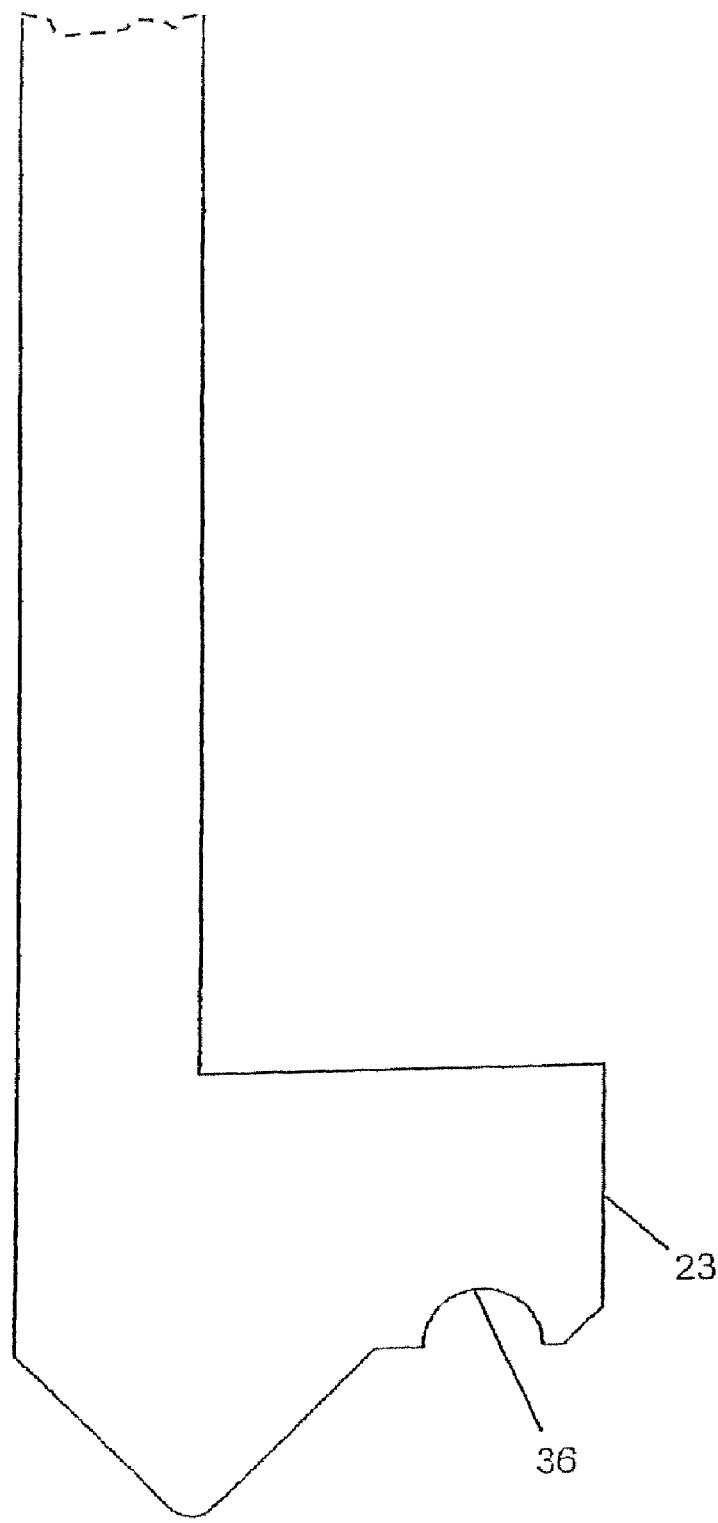
FIG. 11 shows a cross sectional view of an embodiment of a sled runner associated with a pan/tilt head.

In FIG. 10, the pan/tilt head includes the tilt motor 10, the worm screw 11, the worm gear 12, and the tilt drive shaft 13. A first pulley 32 is disposed at an end of the tilt drive shaft 13 extending through the motor housing case top 28 toward the camera platform 22. Second and third pulleys 33, 34 are disposed at opposing corners of the sled support table 24. Ends of the tilt drive cable 35 are secured to opposite sled runners 23 at points near where the sled runner 23 meets the camera platform 22 and opposite from ends of the sled runner 23 adjacent to the second or third pulley 33,34. Note that in the embodiment depicted in FIG. 10, a groove 36 is formed in the bottom surface of both sled runners 23. The groove 36 is shown in more detail in a vertical cross section of the sled runner 23 taken parallel to the tilt axis (FIG. 11).

The drive cable 35 is wrapped around the first pulley 32, which acts as the main drive pulley, routed around the second and third pulleys 33, 34, which act as guide pulleys, and routed along the grooves 36 in the bottom surface of the sled runners 23 to the points at which it is secured. The drive cable 35 is tensioned so that, when the tilt motor 10 turns in one direction, a corresponding end of the sled is pulled downward and, when the tilt motor 10 turns in the opposite direction, the opposite end of the sled is pulled downward. In this way, rotation of the first pulley 32 pulls the edges of one or the other sled sides toward the bottom of its rotation path, thus initiating the tilt motion. Although the embodiment with the cable may have less strength in heavy-duty applications, it has the advantage of greater accuracy, less backlash and fewer parts than the embodiment shown in FIGS. 1-3.

The invention incorporates the concept of motion in both pan and tilt axes around the camera c.g. in combination other special features in the areas of remote control and power-assisted control.

In the invention, the camera mounting structure (consisting of the camera platform 22 and runners 23 and sled support table 24 and sides 25) is isolated from the motor chassis with respect to both the panning and tilting motions. This is to say that both motors and their housing remain stationary during both pan and tilt movement. This is accomplished by using a bearing and shaft assembly which transmits the driving force of both the panning and tilting motors to the mounting sled along the same axial line. The pan drive shaft 17 which transmits the power from the panning motor to the sled assembly is hollow and acts as the housing for the tilt drive shaft bearings 27 and tilt drive shaft 13 which transmits the power from the tilting motor to the sled assembly. In the embodiment pictured in FIG. 1, the sled support table 24 is bolted rigidly to a flange at the top of the hollow pan drive shaft 17. A motor housing case top 28 acts as the support structure for the outer races of both of the pan drive shaft bearing units 26. The outer edge of the flange of the pan drive shaft 17 and a hexagonal locking ring 29 are the supports for the inner races of both of the pan drive shaft bearing units 26.

Figure 2:
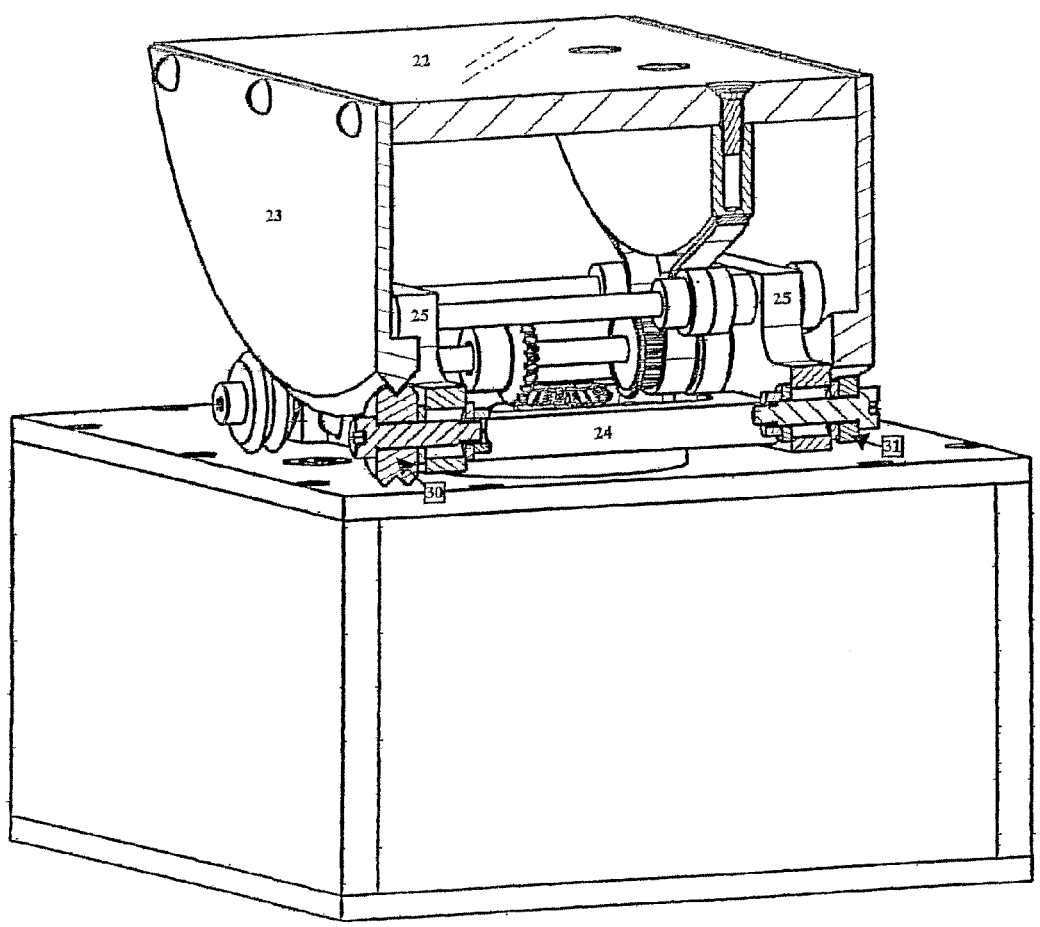
FIG. 2 is another view of the pan/tilt head of FIG. 1 with a different cutaway form

FIG. 2 is another view of the pan/tilt head shown in FIG. 1 with a cutaway view through the camera platform 22 and runners 23 and the sled support table 24 and sled support sides 25. This view also depicts a cutaway view of two sled mounting roller bearings 30 and 31.

The embodiment of the pan/tilt head being described solves the problem of lateral movement of the mounting sled by shaping the bottom surface of one or both of the runners to form a point with respect to the cross section of the bottom of the runner. See the runner cross section in FIG. 11. The two surfaces that form the point fit securely into a v-grooved roller 29 rather than a flat roller bearing race. In one embodiment (FIGS. 1-3), the v-groove roller is on one side. This limits overall lateral movement without imposing reduced tolerances to ensure the sled does not bind between v-groove rollers on both sides should the sides of the sled become not parallel at some point for some reason. Nevertheless, the v-groove rollers 29 and sled runners 23 may be constructed with sufficient tolerances to permit both runners to have pointed bottom surfaces in another embodiment (FIG. 10). The two sled runners are held in contact with races (e.g., flat on one side and v-grooved on the other) by an additional set of bearings which ride against a lip formed on the inside edge of the sled runners. Because of the additional set of bearings on the inside of the runners holding them against the external bearings, and because of the v-groove pulleys, unwanted movement of the mounting sled in all directions is limited and minimized. This configuration also allows the unit to be operated in an inverted position.

Figure 12:
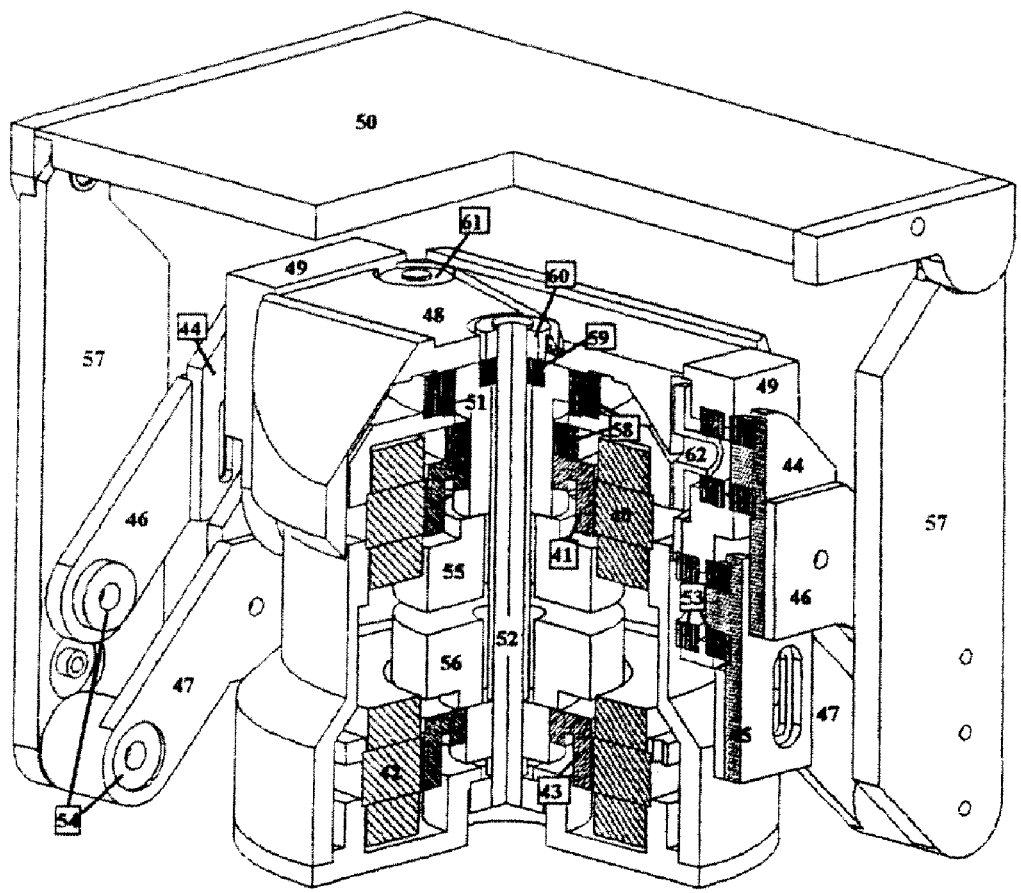
FIG. 12 shows a cutaway view of another embodiment employing the frameless torque motors and a pantographic mounting apparatus.

Another embodiment of the invention features a camera mount configuration which offers the same advantage of under-camera mounting and movement around the camera c.g. in both axes while allowing adjustment for cameras of different height. The sled or cam design previously described involves fewer moving parts, but must be constructed with a sled diameter chosen for a specific height of camera, (although the weight of the payload is irrelevant.). FIG. 12 depicts this embodiment of the pan/tilt head incorporating aspects of the invention with a 90-degree cutaway form. The pan/tilt head includes a pan motor stator 40 and rotor 41, a tilt motor stator 42 and rotor 43, an upper elevator arm 44 and lower elevator arm 45 on each side, an upper crossbar 46 and lower crossbar 47 on each side, a pan table 48, with two pan table sides 49, a camera platform 50, a pan shaft 51, a tilt shaft 52, eight elevator arm bearings 53, eight crossbar bearings 54, a pan shaft position encoder 55, a tilt shaft position encoder 56, four vertical support bars 57, two pan shaft bearings 58, two tilt shaft bearings 59, a tilt shaft drive pulley 60, two cable guide pulleys 61 and two elevator arm pulleys 62.

This embodiment uses a dual pantograph linkage instead of the sled cam to transmit the power from the pan table to the camera-mounting platform. Two elevator arms 44, 45, on each side of the pan/tilt head are connected to the pan-table sides 49 and allowed to rotate around the centers of the upper and lower elevator arm bearings 53. A crossbar 46 is attached to each of the elevator arms in a manner, such as slotted holes and corresponding bolts, which allows the effective length of the elevator arms to be adjusted. At the left and right extremities of the crossbars, there are bearings 54 connecting each vertical camera platform support (vertical support) 57 with one end of the upper and lower crossbar 46, 47. There are four vertical supports in total supporting the camera platform 50 at each of its four corners. The effective length of each elevator arm is the distance from the center of the pan-table side bearing to the perpendicular line described by the bearings at the ends of its crossbar. This linkage configuration can be thought of as a dual pantograph because of the two parallelograms formed on each side of the pan-tilt head by the pan-table side 49, the front and rear vertical supports 57 on either side of it, and the imaginary lines between the elevator arm bearings 53 and the crossbar bearings 54. It should be noted that for free movement in the tilting plane, the distance between the upper and lower crossbar bearings where they attach each crossbar to the vertical support is the same as the distance between the upper and lower elevator arm bearings.

Figure 13:
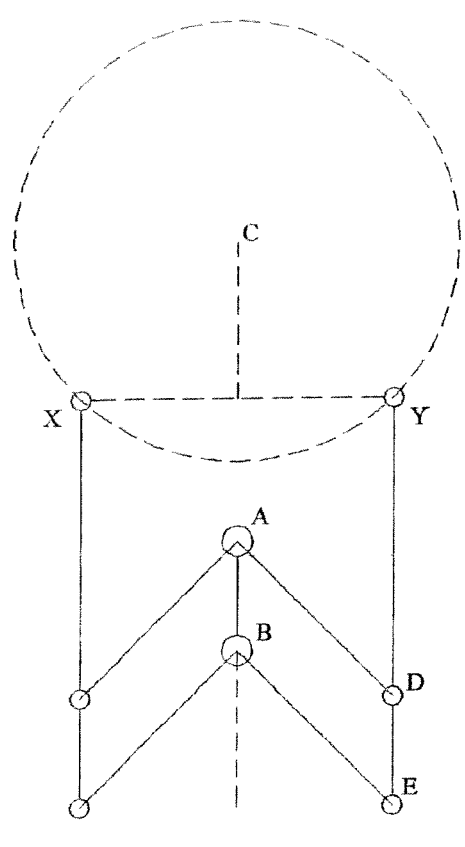
FIG. 13 shows a graphic representation of the dual pantograph linkage.

FIG. 13 shows a graphical representation of the relationship between the elevator arm bearings (A and B), the crossbar bearings, (D and E), the vertical supports (line YDE), and the camera platform (dashed line XY). The dashed line descending from point B represents the effective length of the elevator arms. This length should be adjusted so that it is the same as the dashed line descending from point C, which represents the height from the base of the camera to the camera c.g. and the center of the dashed circle. The dashed circle in FIG. 13 represents the revolution of the camera platform and its radius is the same as the distance from elevator arm bearing A to crossbar bearing D (line AD).

Figure 14:
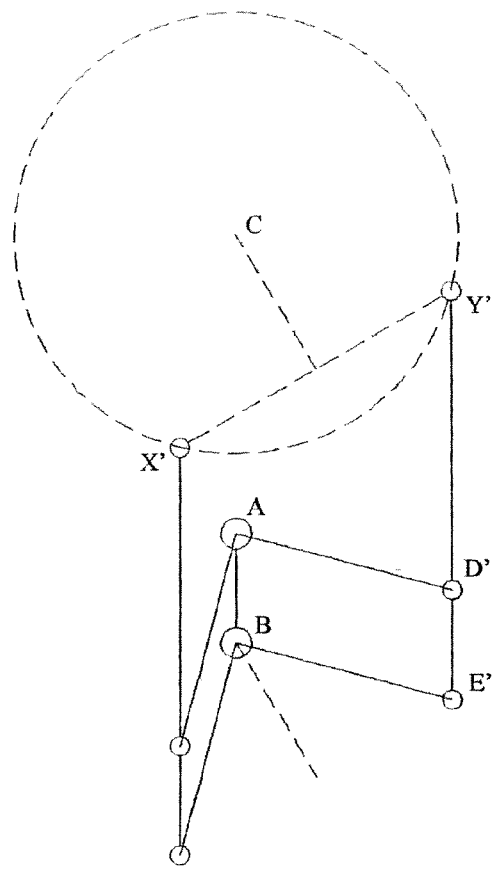
FIG. 14 shows the pantograph linkage having been tilted 30 degrees.

In FIG. 14 the elevator arms have been rotated 30 degrees around their bearings (points A" and B'). In the invention, the bearings at points A and D are fixed with respect to the rotating pan-table. Because of the pantograph action of the elevator arms and crossbars, the vertical supports are held upright and parallel to the line formed by the upper and lower side bearings (line Y'D'E'). As the vertical supports travel along an arc following the circumference of the dashed circle, the connected camera platform and attached camera are tilted, following along the same arc depicted by the dashed circle. It can be seen that throughout this motion the camera c.g. at point C remains fixed directly above the centerline marked by the elevator arm bearings A and B (line AB).

Figure 15:
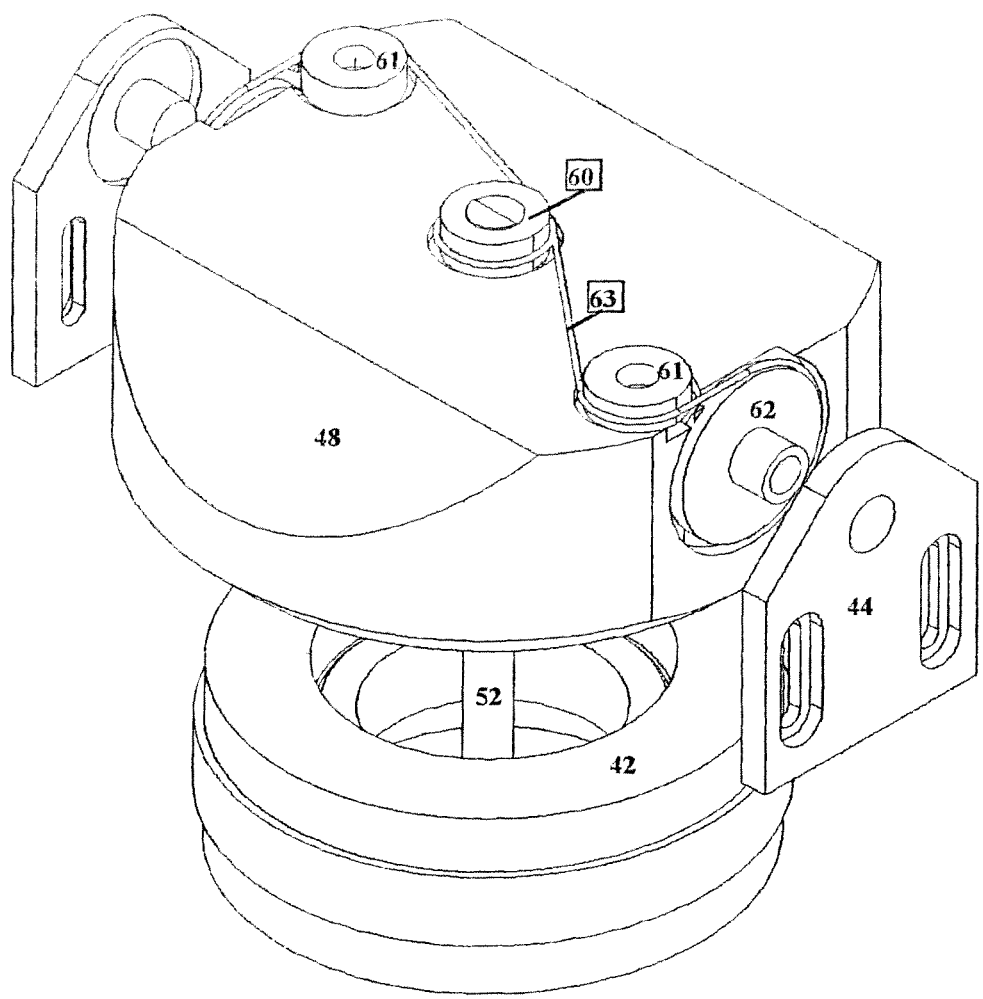
FIG. 15 shows the cable drive train used in conjunction with the pantographic mounting apparatus.

FIG. 15 depicts the cable drive train used in the dual pantograph embodiment. In this case, instead of the sled side, the cable is fixed to an elevator arm pulley 62 on each side of the pan-table and travels back over the guide pulleys 61 to the tilt shaft pulley 60. Rotation of the tilt motor 42 is transmitted through the tilt drive shaft 52 to the tilt shaft pulley 60 where it is again transmitted through the cable to the two elevator arm pulleys 62.

The invention offers significant advantages to the film or television producer over other pan/tilt heads, including remote pan/tilt heads. Remote control cameras are often used because of particular constraints that make a traditional manned camera difficult to employ. For example, a camera placed inside a moving racecar, where there is very limited available space. The invention allows for a much more compact panning head for a given camera weight. Since both motors transmit their power along the same axis, they may be mounted side by side in a much smaller enclosure than another remote control head where the two motors need to be somewhat removed from each other and positioned along axes which are displaced by 90 degrees from each other. Because the motors do not need to move their own weight as well as that of the camera, a less powerful and quieter motor may be used for a given camera weight. Less audible noise is desirable, for example, to the producer of a musical or theatrical event where an audience is present.

FIG. 12 depicts an embodiment of the invention that employs a motor configuration that takes particular advantage of the concentric positioning of the pan and tilt drive shafts. In a case where higher camera rotation speeds are required (and a reduced positioning accuracy), frameless torque motors may be employed in a direct drive configuration. Each motor is manufactured in two pieces—a rotor 41 and a stator 42. These motors do not have the housing and shaft bearings seen in most motors. In this case, the housing for the pan/tilt head provides the covering for each of two motor stators and rotors. The rotors are hollow. One rotor is fixed rigidly to the pan shaft 51 and the other rotor to the tilt shaft 52. The same bearings 58, 59, that support each of the pan and tilt shafts support the motor rotors and allow them to turn as an electric field is produced in the surrounding motor windings. This configuration allows for a cylindrical motor chassis (when viewed from above) which allows for better clearance for the camera rotating above. It is also potentially faster because speed reducing gears are not necessarily needed between the motor shaft and the associated pan or tilt shaft. However, as noted above, since the motor and, therefore, the rotation position encoder attached to it do, not make multiple revolutions for each camera revolution, the potential positioning resolution is reduced for a given encoder.

Figure 16:
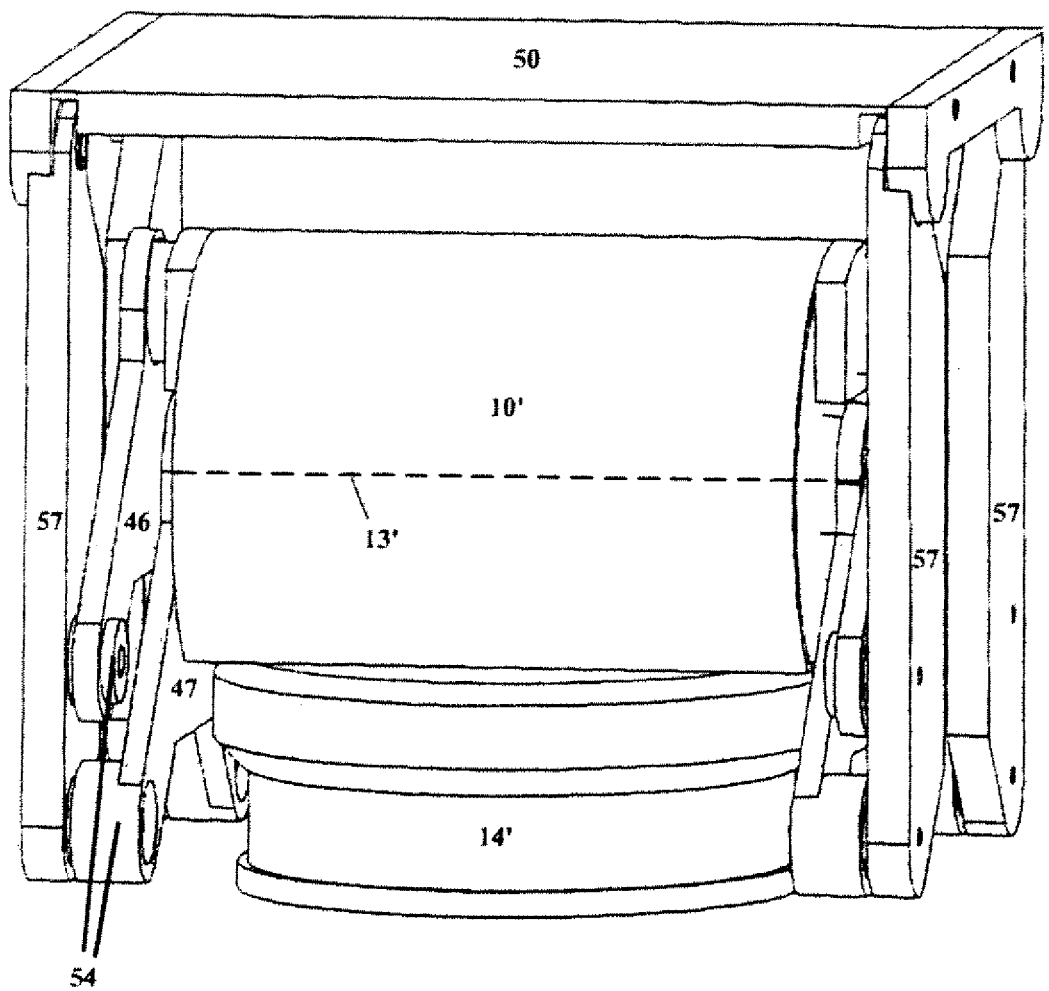
FIG. 16 shows the pantographic linkage used with the tilt motor rotated 90 degrees.

FIG. 16 depicts another embodiment of the invention that combines features described above in another way in order to offer a unique set of advantages in certain circumstances. Previous embodiments have employed the concentrically mounted motors and drive shafts in order to minimize the mass of the moving parts. In some cases it may also be seen as advantageous for the pan tilt head to project the basic footprint and possess more of the basic appearance of the traditional mechanical pan-tilt head. In this embodiment a pan motor 14' has been rotated 90 degrees while a tilt motor 10' has retained its horizontal orientation. In other words, the pan motor is mounted so that its drive shaft turns in a vertical axis, while the tilt motor is mounted (as previously described) so that its drive shaft turns in a horizontal axis. In this embodiment, not only does the entire apparatus have a more traditional appearance, but, by placing the tilt motor 10' between the pantographic linkages 46, 47, 57 as shown in FIG. 16, the tilt drive shaft may now be driven directly without the use of the tilt drive pulleys and cable. For example, in the embodiment with the pantographic linkage 46, 47, 57, the tilt drive shaft 13' (shown in phantom in FIG. 16) extends through the two bearings of the lower elevator arms 47 and runs directly through the center of the tilt motor 10'. The rotor of the frameless tilt motor is mounted on the tilt drive shaft 13' and relies on the elevator arm bearings for support during its rotation. All other aspects of the dual pantograph mounting remain the same as previously described.

In several embodiments, the invention offers two types of control. One type of control, which may be less expensive, provides remote control via a computer interface. Another type of control provides power-assisted control via an electromechanical control arm. Power-assisted control maintains a high degree of control feedback and sensitivity and may be implemented for remote control or for local operator control of a manned camera.

The computer interface in one embodiment of the invention goes farther than any system in production or described in the prior art to provide the operator with visual cues for directing cameras on a control screen. As previously stated, this option is provided as a less expensive control method. Typically, a standard computer mouse is used to minimize cost. However, a touch screen or any other type of pointing device may be implemented.

In the embodiment of the invention being described, the computer interface provides improved visual feedback cues with features not previously disclosed or produced. For example, as the operator positions the cursor over the image on the monitor for the camera to be controlled, a set of lines, one vertical and one horizontal, appear superimposed on the picture like "crosshairs." Any point in the picture may become the center of motion control depending on where the cursor is when the mouse button is depressed. When the button is depressed, the crosshairs become stationary and further movement (dragging) of the cursor results in the camera image following the cursor up, down, left and right. Once again, the distance from the movable cursor to the center of the crosshairs determines the speed. In addition to the crosshairs and movable center, several other visual cues are provided to the operator. As the camera is moved by the cursor, the computer constantly superimposes a dynamic vector line onto the image from the camera. This vector line moves as the cursor moves and appears to connect the cursor and the center-position crosshairs, which were defined when the mouse button was pressed in the picture area of the monitor. This gives an instantaneous cue to the speed and direction as well as the path to be followed back to the center for a smooth gradual stop.

Figure 6:
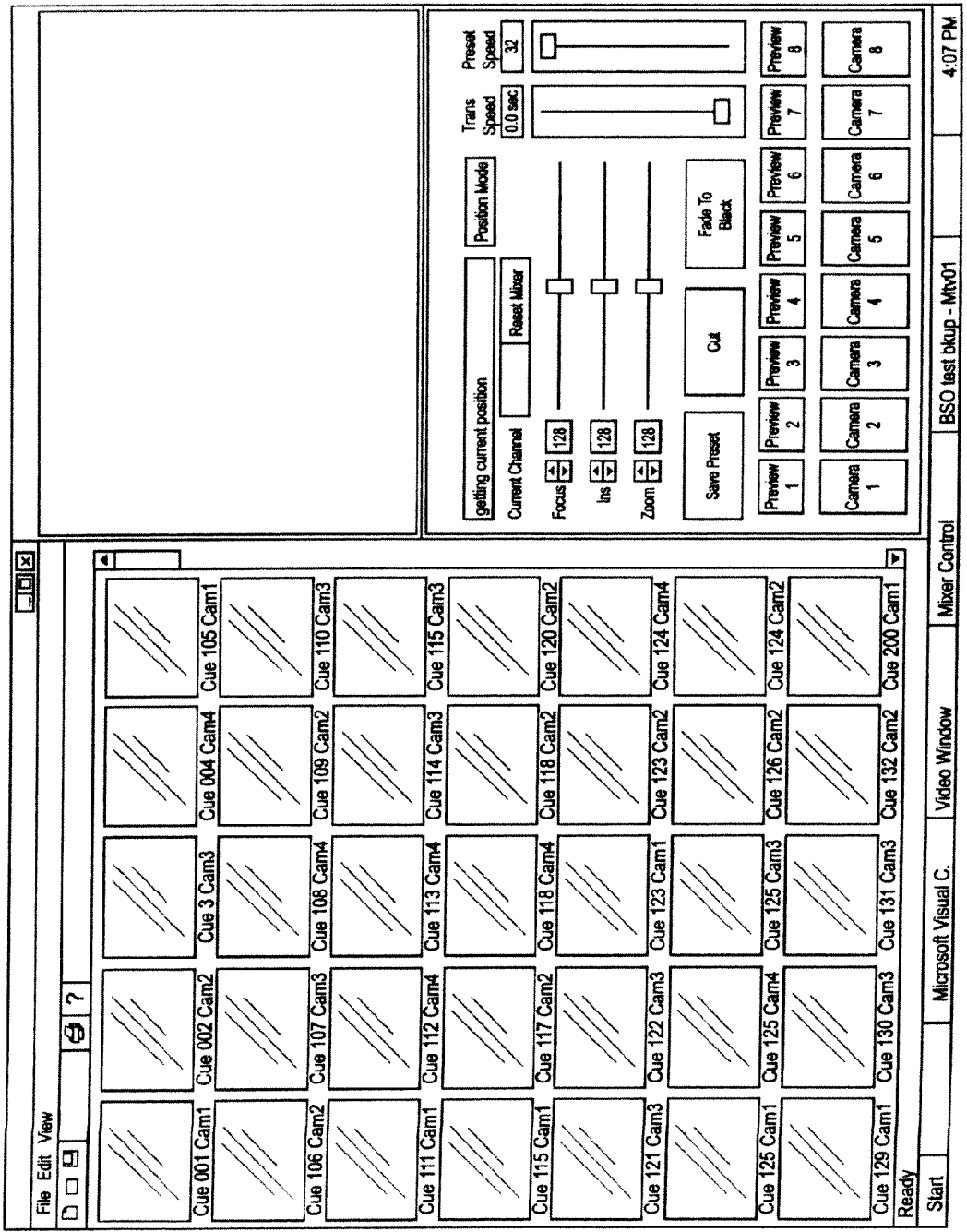
FIG. 6 shows an exemplary computer display during operation of the camera control system.
Figure 7:
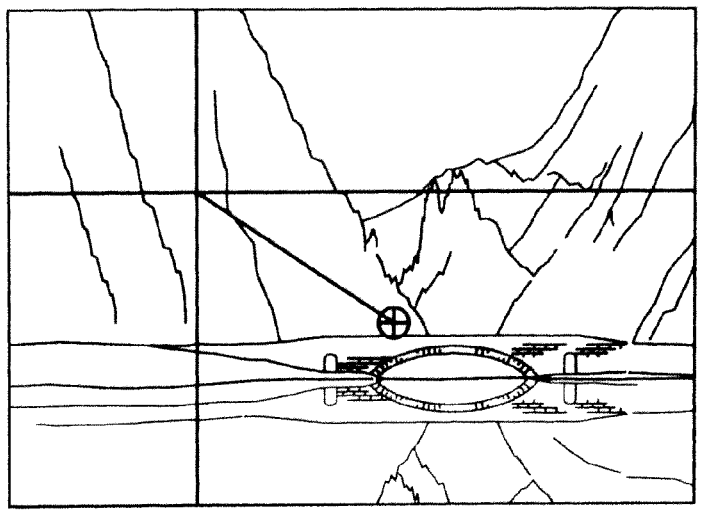
FIG. 7 shows another exemplary computer display during operation of the camera control system.
Figure 8:
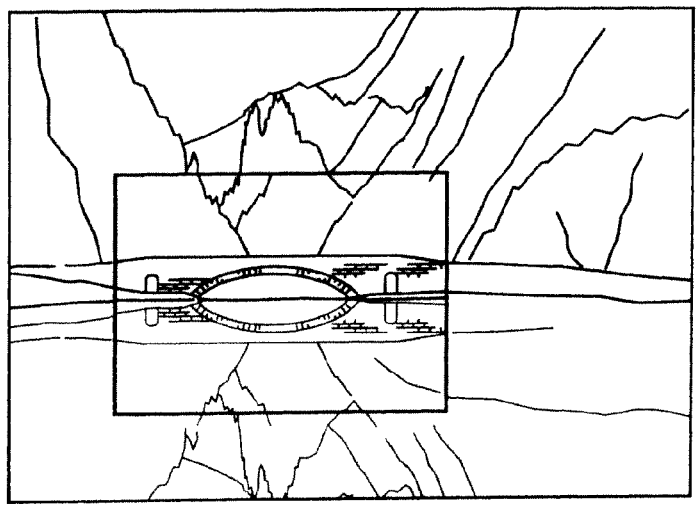
FIG. 8 shows yet another exemplary computer display during operation of the camera control system.
Figure 9:
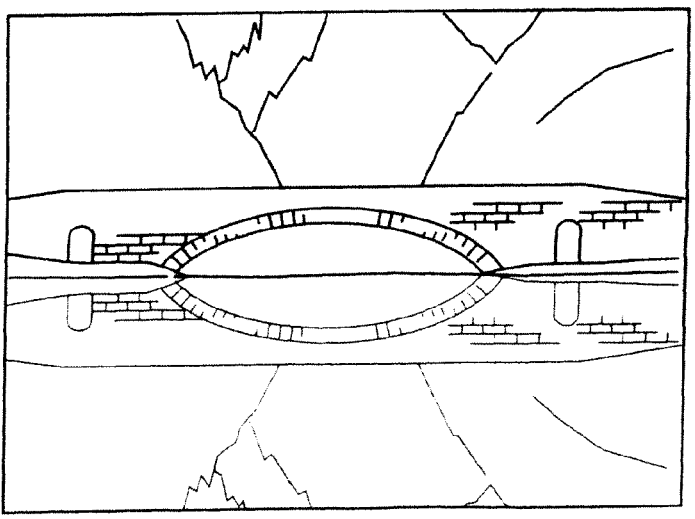
FIG. 9 shows still another exemplary computer display during operation of the camera control system.

Another efficient feature of the computer interface is a graphical aid to zooming and framing. Going back and forth between the zoom controls on the computer keyboard and the motion controls tends not to be as efficient and quick as it is for a manned camera operator. This system allows you to "drag-enclose" a graphical box directly on the camera image. This is done by clicking in the camera image on the computer screen (with the control key depressed) at the point that you ultimately wish to be the upper left corner of your composed shot. When you drag the cursor down and to the right, a box is drawn in the camera image which maintains its correct aspect ratio for the format of the camera being controlled (for instance a ratio of 4 by 3 for an NTSC television image.) After the cursor is released, the composition box can either be moved slightly or its size adjusted to fix the framing. Then the camera is given the command to move to the position and lens zoom setting which will fill the camera output image with the image described by the composition box originally superimposed on the camera image. FIG. 6 depicts the computer screen while the system is being operated. The upper right window in the screen represents the video control window for the camera that has been selected for manipulation. This window normally displays the actual image from the selected camera over which the control graphics described above is superimposed. FIGS. 7 through 9 depict a detail of the video control window during operation. In FIG. 7, the "cross-hairs" are shown positioned slightly to the left and above the center of the picture. This becomes the center of movement and is the point where the cursor is returned in order to smoothly and gradually cease camera movement. FIG. 7 shows the cursor currently being dragged below and to the right of the center of movement. The vector line linking the cursor to the crosshairs represents the speed and direction of the camera movement. In FIG. 8 the resulting position of the camera is depicted. Note that the camera is now pointing to a position that is lower and to the right of FIG. 7. FIG. 8 also depicts a zoom framing box. After this box has been drawn by clicking and dragging the cursor with the appropriate function key depressed, another function key will command the camera to move and zoom to the position which will fill the frame with the inscribed picture. The resulting framing for the camera after the move command is depicted in FIG. 9.

Figure 4:
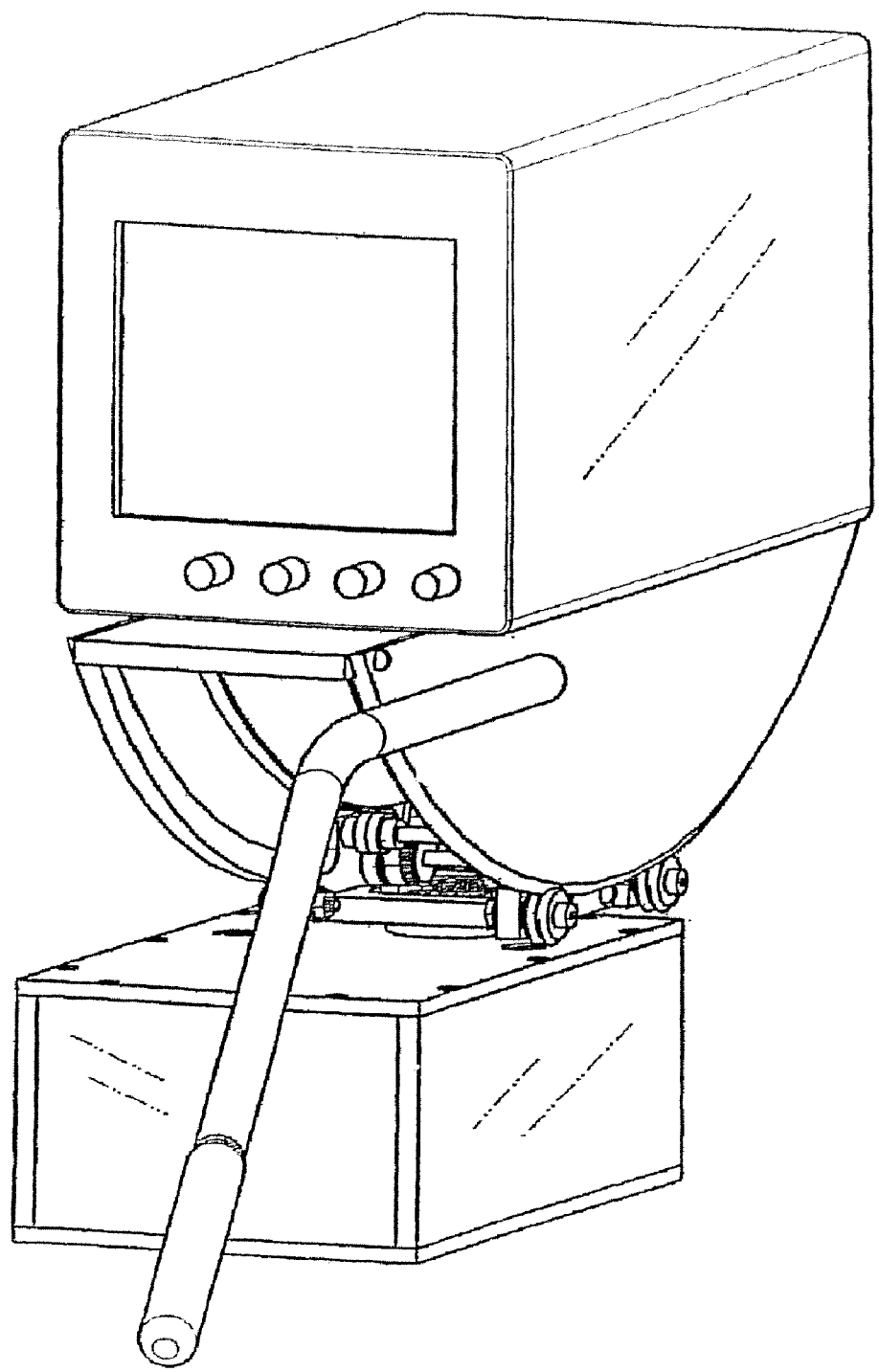
FIG. 4 is yet another embodiment of a pan/tilt head with a display monitor installed thereon.

An alternate method of control is the electromechanical positional control arm. As was stated earlier, in the past this type of controller was designed around a traditional pan/tilt head with the addition of encoders which gave positional information to the remote control pan/tilt head. The invention takes a different approach. Instead of a traditional panning head at its heart, this controller is comprised of a motorized pan/tilt head similar to the remote control head with a control arm attached to the camera mounting sled. In one embodiment, instead of a camera on the camera mounting plate, a video monitor for the remote controlled camera is situated on the controller's mounting sled. This is depicted in FIG. 4. In this configuration, strain gauges or pressure sensitive resistors are housed in the handle, which sense the pressure that the operator applies to the control arm. Instead of the hand pressure directly moving the control arm (as is the case with existing designs) the computer senses the pressure and initiates a move command to the control arm motors as well as the identical command to the remote control camera head. The computer responds to varying pressure on the control arm with proportionally varied speed commands to both the control arm motors and the remote control pan/tilt head. Mounting the monitor directly on the panning head in this manner simulates the feedback that a traditional camera operator has as he looks through the viewfinder of a camera. The movement of the viewfinder and the movement of the camera are integrally locked together so that an experienced traditional camera operator can quickly begin using this remote control system without additional training or practice.

Figure 5:
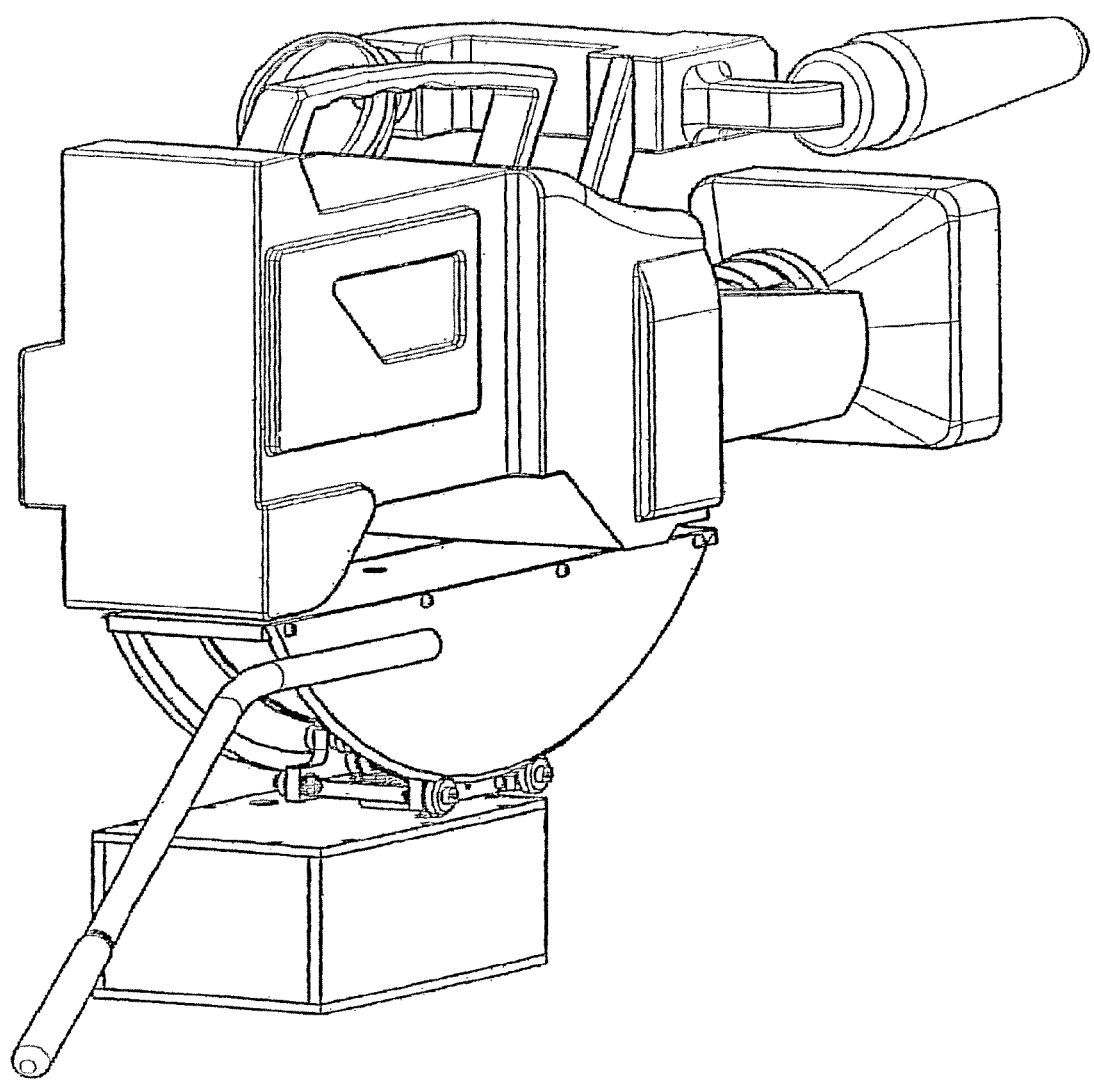
FIG. 5 is another view of the pan/tilt head of FIG. 4 with a video camera installed thereon.

One of the features of this embodiment of the invention is that the pressure sensitive control arm can be used on a motorized panning head with a camera mounted on it instead of the monitor. This configuration then becomes a power assisted manned pan/tilt head with a camera as depicted in FIG. 5. This configuration could simultaneously be used by the camera operator to remotely control other unmanned cameras. Once again it should be noted that the hand pressure applied to the handle depicted in FIGS. 4 and 5 does not directly move the camera or monitor. This hand pressure is merely sensed by the microprocessor and translated into the pan and tilt motor speed controls. An advantage of this is that the pressure sensors in conjunction with the controlling computer software could be adjusted to move the heaviest of cameras with the slightest amount of finger pressure if so desired. This offers tremendous flexibility to a television or film producer. With a series of these power-assisted pan/tilt heads, each with their own camera and view-finder/monitor, a camera operator could simultaneously operate one camera with greater ease or control the movement of one or more other cameras in the system.

The embodiment of the invention that employs the frameless torque motors without the associated drive gearing, can also be manipulated by hand and used directly as a manned pan/tilt head or a controller for other remote control camera heads. In this embodiment, the strain gauges or pressure sensitive resistors are not needed because the pan and tilt shafts can be moved directly by hand pressure. There is no gearing connected to the motor rotors to resist this movement when there is no electricity applied to the motors. Instead of electromagnetic force directly proportional to the hand pressure moving the device, small amounts of electromagnetic force are used in opposition to the hand pressure to give the operator the sense of "drag" which has traditionally been designed into manned camera heads. In traditional mechanical pan-tilt heads, the drag or resistance is linear and fine micro adjustment of the drag amount is not possible. With the invention, not only is an extremely wide range of drag possible, but it can be delineated with a much finer resolution. Also the application of drag is not merely linear with respect to speed. With the invention, a "drag curve" can be chosen such that movement at very slow speeds could have much less resistance or vice-versa. With traditional mechanical drag designs, there is a function of friction in which it takes more force to initiate movement from the stopped condition than it does to simply continue the motion once started. This is also evident when the traditional pan/tilt head is gradually slowed to a stop. There is a point where the greater coefficient of stopping friction exceeds the hand force and the camera comes to a small but perceptible abrupt stop. This phenomenon is greatly reduced with the invention. The operator has a choice about exactly how much drag is desired at any given speed. The drag can decrease to zero just as the motion ceases.

In the invention, the microprocessor makes very quick and very small changes in the amount of current applied to the motor windings in order to move the remote control camera at exactly the desired speed. The acceleration and deceleration are also monitored and adjusted as many as 20,000 times per second. This is the same sensitivity that is required in order to apply the electromagnetic force in opposition to the hand motion when the invention is used as a locally controlled pan/tilt head or as a controller for a remote head. In the case were the microprocessor is initiating the movement in the remote control pan/tilt head, a desired position counter (DPC) is maintained within the memory of the microprocessor which represents the desired position of that motor shaft (either pan or tilt) at any moment. The DPC is updated either up or down at a frequency corresponding to the desired speed. An upward incrementing of the DPC would indicate a clockwise rotation. While the incrementing or decrementing of the DPC occurs at fixed intervals, another part of the microprocessor control program is constantly monitoring the actual position of the pan and tilt shafts as indicated by the optical shaft encoders using an actual position counter (APC). These encoders indicate the direction of the actual movement and give a short electrical pulse at regular intervals corresponding to a fraction of a rotation. The actual position is compared to desired position at a given moment and the electrical current to the windings is appropriately adjusted to bring these two measurements together. In other words, a change is the desired position causes a change in motor current resulting in a change in actual position.

Figure 17:
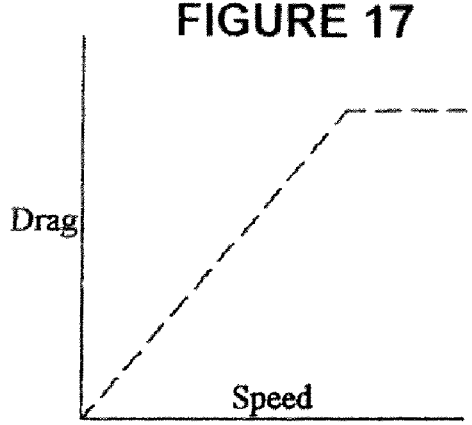
FIG. 17 is a graph depicting a large maximum drag over a wide range of PPC/APC differential values.
Figure 18:
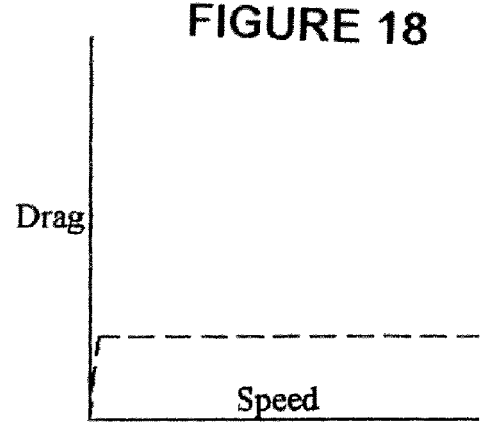
FIG. 18 is a graph depicting a small maximum drag over a small range of PPC/APC differential values.
Figure 19:
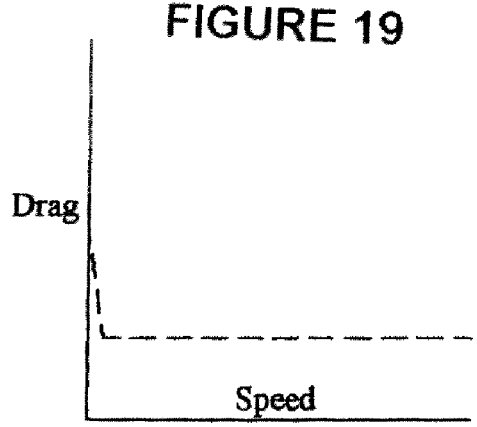
FIG. 19 is a graph where the drag is constant and independent of speed except for the spike of force required to initiate any movement.
Figure 20:
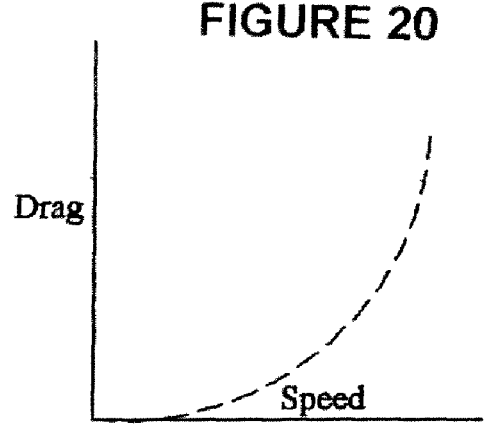
FIG. 20 is a graph in which the drag increases as the speed increases.
Figure 21:
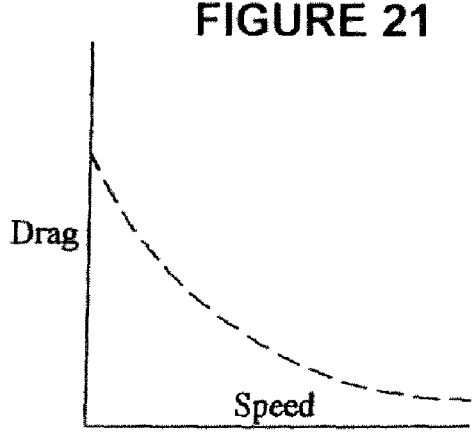
FIG. 21 is a graph in which the drag decreases as the speed increases.

In the case where the invention is being used as a manned camera head or remote camera controller, there is a change in the logic of the microprocessor. The microprocessor here maintains a "present" position counter (PPC) that represents the shaft's "present" rotational position. Any manual pressure on the pan/tilt head control arm will result in rotation of the shaft and optical encoder so that the "actual" position will now differ from the PPC. This causes an electromagnetic force to be applied by the microprocessor in opposition to the manual movement. As the difference between the APC and PPC increases so will the opposing magnetic force. At this point, the magnetic force will increase to the level that no further manual motion is possible unless an adjustment is made to the PPC. When the difference between the APC and PPC reaches a level predetermined in the microprocessor control program, the PPC is incrementally adjusted in the direction of the APC. Further changes to the APC will result in changes to the PPC on a one to one basis but maintaining the predetermined offset. The microprocessor constantly monitors the offset between the APC and PPC and bases the amount of opposing electromagnetic force on this factor. As the pan/tilt head continues to move in the same direction at a constant speed, drag will remain constant. As the manual force on the control arm is diminished, the speed of the pan/tilt head will decrease as will the difference between the APC and the updated PPC. This will result is a decrease in the electromagnetic drag which will go to zero just as the motion stops and the PPC is updated to equal the APC. The drag that is apparent to the operator is dependent on two factors, each of which can be adjusted several thousand times per second by the microprocessor depending on the desired drag curve. First, is the maximum amount of electric current applied to the motor windings in opposition to the manual movement. Second, is the distribution of the range of electric current over the predetermined range in the lag between the actual and present position. Since the lag or difference between the PPC and APC is related to the speed at which the pan-tilt head is moved, one can express these two factors in a graph of drag (in units of torque) versus speed. FIG. 17 depicts a large maximum drag distributed over a wide range of PPC/APC differential values. In effect, at slow speeds the drag is very small, but the drag continues to grow as speed increases until maximum drag is reached. FIG. 18 depicts a small maximum drag distributed over a small range of PPC/APC differential values. In effect this is a "constant" drag curve wherein the small maximum drag is attained very quickly, but then does not increase after that even though movement speed may increase. This is the closest to the drag curve of a traditional mechanical pan/tilt head represented in FIG. 19. In this case the drag is constant and independent of speed except for the spike of force required to initiate any movement. FIGS. 20 and 21 represent other conceivable practical combinations of different maximum drag current and PPC/APC differential range distributions. Both of these examples show the nonlinear drag potential of the invention. FIG. 20 depicts a curve in which the drag increases as you attempt to move the pan/tilt head faster and FIG. 21 is the opposite. It is also possible in some unique situations to use the APC by itself (in addition to the PPC/APC differential) in the calculation of the drag curve. For instance, in pan/tilt heads there are usually practical limits to the extents of travel in the pan or tilt axes. This may be caused by mechanical limits in the apparatus, by the cabling attached to the camera, or by features in the landscape, studio, or set where the filming is being done that are not wanted to be seen in the final product. The invention allows for the programmable drag to increase as desired pan or tilt limits are approached, thus providing such feedback to the camera operator and avoiding a hard bump or cable pull from occurring if the limit is reached.

In addition to placing remote controlled cameras in inaccessible or dangerous locations for operators, another desirable feature of a camera control system is that one camera operator can command any number of cameras. In this embodiment of the invention, the computer software helps an operator manage, organize, and operate multiple cameras. For instance, this system may be used in the production of a dramatic or musical program where a series of preset camera positions prepared before the performance is stored and organized in the computer as a "cue list." Each preset shot or "cue" is prepared by moving the desired camera to the position and lens setting desired by the director. The camera is moved by any of the controller options described above. When the command to store the preset is given, the lens settings (which include the focus, iris, and zoom setting) are stored in a database entry for each cue or preset along with the pan and tilt position of the camera mount and the cue number. Each of the shots appear in a computer window filled with small thumbnail images representing all of the shots from many different remote control cameras that will be used during the performance. The cue-list window is shown seen in the left portion of FIG. 6. The shots appear in the order that they are intended to be used regardless of which camera is used for each shot. In general, consecutive presets employ different cameras, however if the director wants to program a dynamic camera move to appear on the program output, this is represented in the cue list by consecutive presets for the same camera. The two presets represent the starting and ending point for that programmed camera move. In this case, information is stored in the cue list database to represent the speed at which the camera should move from its starting to its ending position.

At the beginning of the program, all of the cameras are positioned to their respective initial presets. At that point, all the operator need do is hit the "return" key when each successive shot is needed. The computer then triggers a video mixer to make the programmed transition from one camera to another on the main program. It is this video mixer which routes the desired camera output either to broadcast air, video tape recorder, or a projection monitor where it will ultimately be seen by the audience. When the video mixer transitions from one camera to another, the camera which was previously seen, is now free to be moved by the computer to the next position in which it will be used in the cue list. In addition to the preprogrammed camera moves described above, a remote camera operator could override computer control at any moment and move any of the cameras including the "on air" camera if he so desires. Also, in a situation between that of total manual override and total computer control, the computer still maintains the order of shots required by the programmed cue list. The computer automatically provides the remote control camera operator with control of the specific camera that is appearing on the air at that moment. This frees the operator from keeping track of which camera was required for which shot and in which order. In addition, control of the preview camera (the camera that is designated to be seen next) could be routed to a remote control camera operator to make any adjustments to the camera that are needed before the camera appears "on air." In this way, two or three people could competently manage a production involving a large number of cameras.

The system offers several features for managing several remote control cameras in a production that is not entirely scripted, such as a sporting event. Several preprogrammed shots for each camera appear in the computer control window sorted by camera number rather than a numbered cue list. The director could quickly select a shot by clicking that shot's thumbnail image and the designated camera is instantly sent to that position.

One of the features of the computer interface is the ability to calculate the position of a subject in three-dimensional space from the position of two and in some cases one camera trained on that subject. If one remote control camera is placed at a sufficient and known height above a plane such as a stage, studio or playing field, the computer calculates the position of a subject on that known plane based on the pan and tilt positions of that elevated camera. The computer must be given the height of the camera above the stage or field, and then as the camera operator moves the master camera to follow the subject, the position of the subject on that stage or field may be calculated using the following formulae:

$$D = H^* \tan(90 - t)$$

And $$L = D^* \tan(p)$$

Where

D=depth or distance of subject to vertical line of camera position

L=lateral displacement of subject from center line of stage or field t=the tilt angle from horizontal p=the pan angle from the center line of the stage Using similar formulae, the computer may then direct any of the other remote control cameras in the system to the previously calculated subject position. The computer needs the pan and tilt angle and the distance from the original master positioning camera located above the plane of the stage or field to any other desired slave camera in the system to do so. The pan and tilt angles may be derived from simply sighting the slave remote control camera in the center of the field of view of the master positioning camera. The distances between each of the cameras and the subject are also calculated for the purpose of focusing each of the camera lenses automatically. If it is not possible to elevate one camera above the subjects, two remote control cameras in the system may be focused on a subject from different locations. When the computer is given the accurate distance between the two locator camera positions, the system is able to focus all the other remote control cameras in the system on a subject based on the triangle formed by the two locator cameras and their respective pan and tilt positions.

Figure 3:
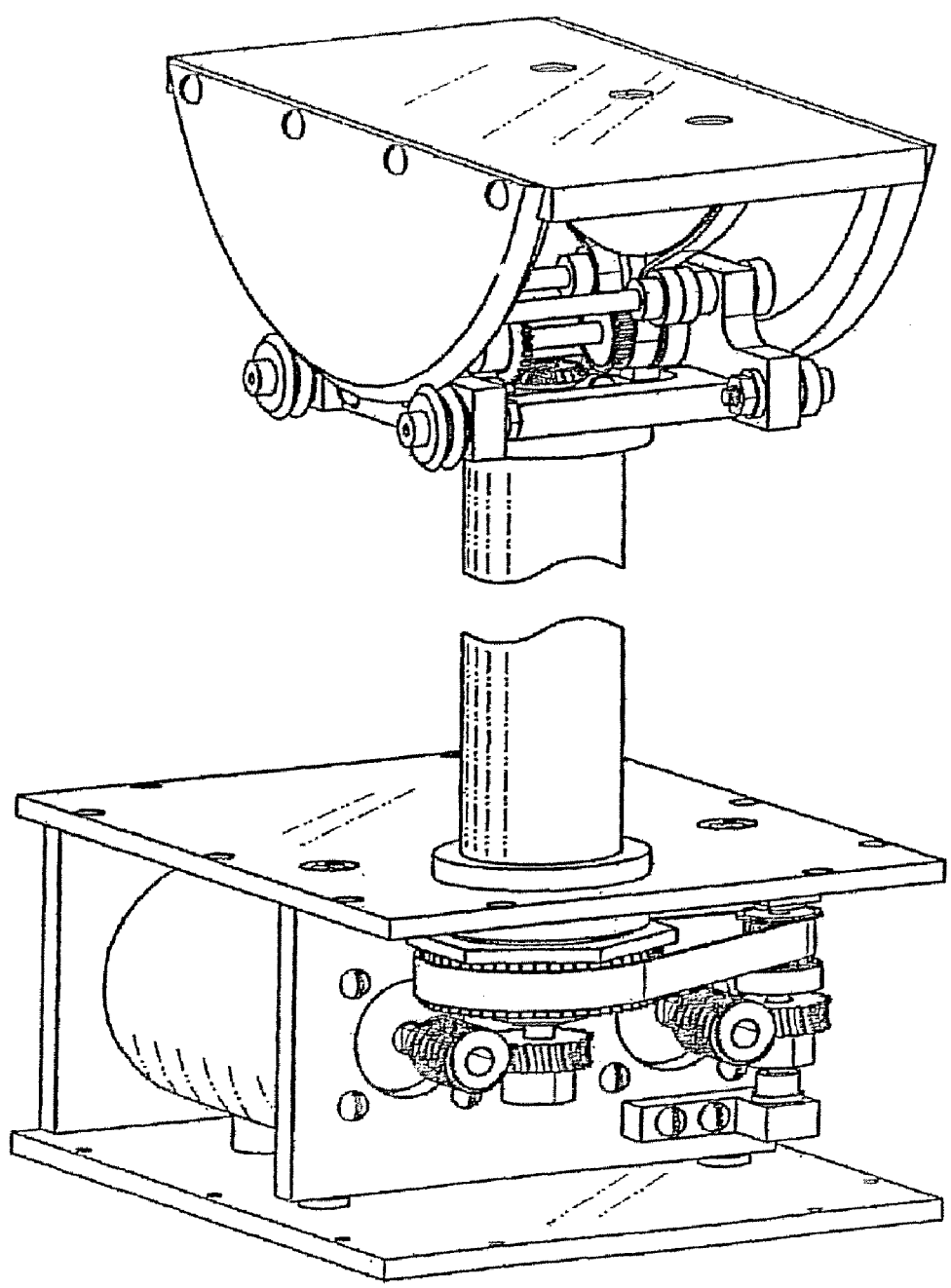
FIG. 3 is another embodiment of a pan/tilt head.

The embodiment of the remote control pan/tilt head described above allows for several production configurations that include pan/tilt heads from earlier designs. Because the camera mounting structure is isolated from both the pan and tilt motors, the shafts can be elongated to the point where the mounting sled can be situated far above the actual motors driving the sled. This can be seen in FIG. 3, which shows the invention with extended pan and tilt drive shafts. This allows a support to house the motors near the floor where their weight adds to the stability of the stand rather than positioning them at the top of the stand which needs to be stiffer and heavier as a result. This also results in a smaller visual profile exposed to a studio or live audience that may find a larger camera control configuration more visually intrusive. FIG. 3 does not depict all of the support structures which are required for the operation of this or any remote control system, but shows the main parts of the invention which could be incorporated into a stand or mount to gain the benefits mentioned in this paragraph.

Another embodiment of the invention is its use with a camera "crane" or "camera jib arm." This is an apparatus that holds a camera out at the end of what may be a very long extension arm. The arm is generally too long to be reached by the camera operator so the camera must be moved by some manner of remote control. The most common way to control the camera at the end of the crane arm is mechanically. In this method, a camera direction control rod is mounted beside the main crane arm to form a pantograph system. In this way, as the main crane arm is moved, the camera always remains directed along a line that is parallel to its original position. Another pantograph arm can be situated beneath the main crane arm so that as the crane is lifted up and down, the camera retains its original tilt angle with respect to the ground or floor. This invention accomplishes the remote control of the camera electromechanically.

The computer control system in this invention makes certain control options available which have not been present in previous systems. With the purely mechanical system, the advantage is that when the main crane arm is elevated or rotated, the camera maintains its directional orientation without attention from the camera operator. The disadvantage is that the subject is usually close enough to the crane that as the crane arm is manipulated, small adjustments to the camera direction need to be made to keep the subject framed in the camera image. With an electromechanical remote control pan/tilt head as well, the operator of the crane is obliged to manipulate the camera pan/tilt controls as he is moving the crane in order to keep the subject framed in the camera image.

With the invention, the camera/crane operator can be freed of many of the control requirements by the computer control system. In this embodiment of the invention, the remote control pan/tilt head can be situated on the end of a crane that has been outfitted with two rotation encoders at the fulcrum of the crane. By reading the output of these encoders, the computer senses the orientation of the crane arm and adjust the pan/tilt head accordingly. As the crane is elevated or rotated, the computer could be set to respond in one of several modes. In one mode, the computer could keep the camera oriented in a line that is parallel to its position before the crane arm was moved. This is analogous to the situation with the mechanically controlled crane.

In another mode, the computer allows the operator directional control of the pan/tilt head just as any remote control head for cameras has done in the past. In another mode the operator has the unique ability to input the distance from the crane to the subject. At this point the computer is able to automatically keep the subject framed within the image frame without any additional input from the operator as the crane arm was manipulated. In yet another mode, the camera/crane operator is responsible for keeping the subject in focus by manipulating the remote focus controls of the invention. The computer calculates the distance to the subject from the focal length of the lens. Then once again, as in the previous mode, the computer could keep the subject framed in the camera image regardless of the crane arm orientation.

In summary, various aspects of the camera control system in various embodiments have been described herein. For example, in one aspect, the dual shaft drive in the pan/tilt head allows the camera to move independently from the motor chassis. In another aspect, the computer interface offers graphical assistance to the operator while providing a low cost control option. In yet another aspect, the addition of an electromechanical control arm to the pan/tilt head serves as an intuitive natural controller for a remote control camera. I have also discussed an embodiment that places a camera directly on top of this pan/tilt head/control arm combination to provide "power assisted" control of a manned camera head. Given the tremendous cost involved in producing a traditional camera head that can easily support and move the largest film and studio cameras with minimal operator force, this is a valuable aspect of the invention. Still another aspect of the invention involves the use of the pan/tilt head on an extended crane or "jib arm," with computer-assisted positioning of the pan/tilt head as the crane is rotated or elevated.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

The invention claimed is:

1. A pan/tilt head comprising:
    a mounting platform;
    a pan table located beneath the mounting platform; and
    a first pantograph linkage connected to the mounting platform and to the pan table, the pantograph linkage configured to permit the mounting platform to tilt with respect to the pan table without moving a center-of-gravity defined respective to the mounting platform.

2. The pan/tilt head as set forth in claim 1, wherein the pan/tilt head further comprises a second pantograph linkage disposed on a side of the mounting platform opposite that of the first pantograph linkage.

3. The pan/tilt head as set forth in claim 1, wherein the center of gravity is spatially offset from the mounting platform.

4. The pan/tilt head as set forth in claim 1, wherein the first pantograph linkage is defined by parallel members connected with the mounting platform and transverse members transverse to and connected with the parallel members.

5. The pan/tilt head as set forth in claim 4, further comprising a tilt motor operatively coupled with at least one of the transverse members to selectively tilt the mounting platform without moving the center of gravity.

6. The pan/tilt head as set forth in claim 1, further comprising:
    a tilt drive train operatively coupling a tilt motor and the pantograph linkage to selectively tilt the mounting platform without moving the center of gravity; and
    an independent pan drive train operatively coupling a pan motor and the mounting platform independently from the tilt motor to selectively pan the mounting platform without panning the tilt drive motor.

7. The pan/tilt head as set forth in claim 1, further comprising:
    a pan drive train including at least a hollow pan drive shaft, the pan drive train coupling a pan motor and the mounting platform; and
    a tilt drive train including at least a tilt drive shaft disposed within the hollow pan drive shaft, the tilt drive train coupling a tilt motor and the pantograph linkage.

8. The pan/tilt head as set forth in claim 7, wherein the tilt drive shaft, the hollow pan drive shaft, the tilt drive motor, and the pan drive motor are arranged concentrically along an axis that passes through the center of gravity.

* * * * *